United States Patent [19]

Combs, Jr. et al.

[11] 3,837,433

[45] Sept. 24, 1974

[54] LUBRICATING SYSTEM FOR CHAIN SAW

[75] Inventors: Roscoe Combs, Jr., Kankakee; Richard W. Condon, Frankfort, both of Ill.

[73] Assignee: Roper Corporation, Kankakee, Ill.

[22] Filed: Mar. 5, 1973

[21] Appl. No.: 338,071

[52] U.S. Cl. ......... 184/15 R, 123/196 CP, 417/476
[51] Int. Cl. ...... F16n 7/16, F16n 7/24, F16n 13/22
[58] Field of Search ............. 184/15 R; 123/196 CP; 417/475, 476, 477

[56] References Cited
UNITED STATES PATENTS

| | | | |
|---|---|---|---|
| 2,650,626 | 9/1953 | Kiekhaefer | 184/15 R |
| 3,185,998 | 5/1965 | Bussey | 417/476 |
| 3,679,331 | 7/1972 | Kushner | 417/478 |
| 3,720,485 | 3/1973 | Holman | 417/475 |
| 3,723,030 | 3/1973 | Gelfand | 417/477 |
| 3,740,173 | 6/1973 | Natelson | 417/477 |
| 3,758,239 | 9/1973 | Hrdina | 417/477 |

Primary Examiner—Manuel A. Antonakas
Assistant Examiner—Daniel J. O'Connor
Attorney, Agent, or Firm—Wolfe, Hubbard, Leydig, Voit & Osann, Ltd.

[57] ABSTRACT

A lubricating system for a chain saw which includes a circular single-lobed cam on the sprocket drive shaft surrounded by an anti-friction bearing. The outer race of the bearing engages a C-shaped loop of flexible tubing progressively to produce peristalic action between the input end of the tubing which is connected to an oil reservoir and the output end which leads to the chain. The output has an adjustable restriction in the form of a throttling valve and an associated bypass line which shunts most of the oil back into the reservoir. The loop of tubing extends about the shaft substantially less than a full revolution and the eccentricity is limited so that the tubing is continuously open throughout its length during at least a portion of each revolution of the drive shaft for impositive pumping of the oil against the restriction for achieving an extremely low but reliable flow rate.

1 Claim, 5 Drawing Figures

3,837,433

PATENTED SEP 24 1974

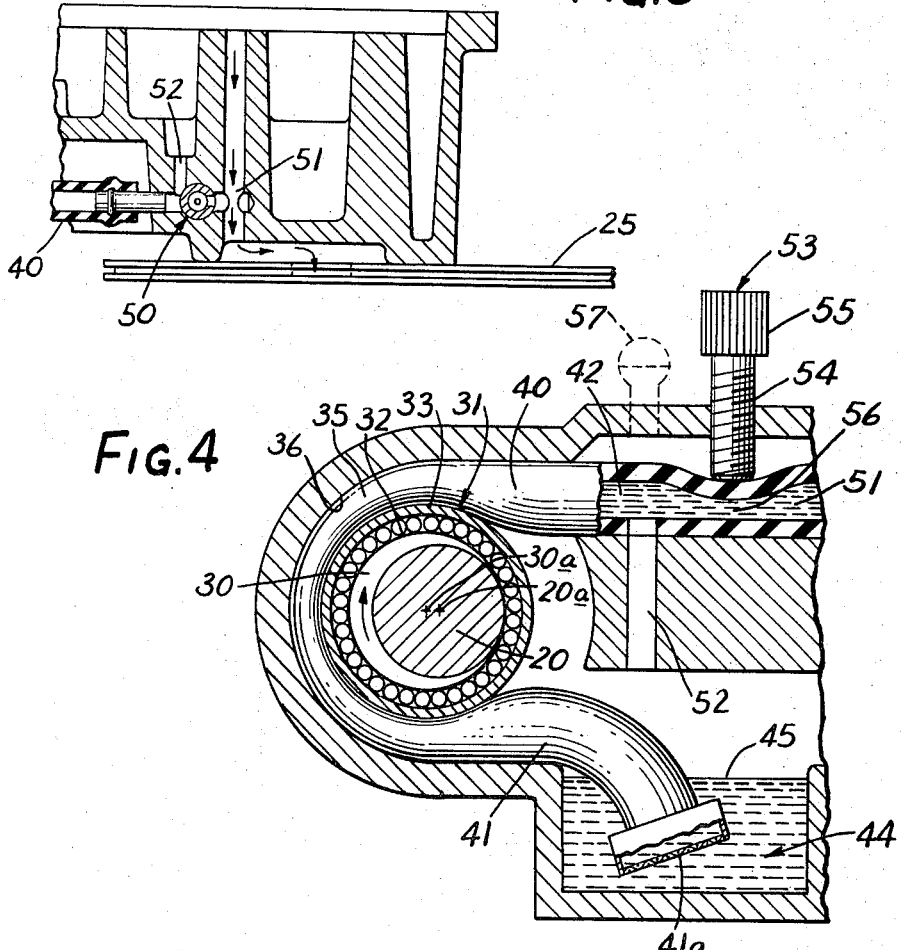

LUBRICATING SYSTEM FOR CHAIN SAW

In operating a chain saw of either the electrically driven or gasoline driven type, it is necessary to supply lubricant, on a continuous basis, to the cutting chain and the blade upon which it is supported. In most chain saws, particularly those in the lower price bracket, lubricant is propelled by a thumb operated plunger to give the parts a "shot" of lubricant at intervals determined by the user. Efforts have been made to provide a metered flow without reliance upon the operator but to date such auxiliary lubricating mechanisms have been either unduly expensive or subject to wear and malfunction. One of the problems has been that the sprocket drive shaft operates at such a high speed it is difficult to harness this motion directly for pumping oil at an extremely slow but consistent rate.

It is, accordingly, an object of the present invention to provide a lubricant pump for a chain saw which utilizes the motion of the sprocket drive shaft operating at speeds on the order of 4 to 8 thousand revolutions per minute for achieving rates of lubricant flow of as little as 5 ounces or less per hour. It is a further object of the present invention to provide a lubricating system for a chain saw which, although effective and reliable, may nevertheless be constructed at low cost and using an absolute minimum of moving parts. In this connection it is an object of the invention to provide a lubricating system for a chain saw which is almost universally applicable to chain saws of both existing and new designs, which is highly compact, which is long lived, free of maintenance problems, and which has been found to be highly reliable.

It is still another object of the present invention to provide a lubricating system for a chain saw in which the rate of discharge may be controllably metered with a high degree of precision so as to insure adequate lubrication while nevertheless economizing on oil.

Other objects and advantages of the invention will become apparent upon reading the attached detailed description and upon reference to the drawings in which:

FIG. 3 is a fragmentary section taken along the line 3—3 in FIG. 1.

FIG. 4 is a schematic diagram illustrating the present lubricating system.

Figure 1:
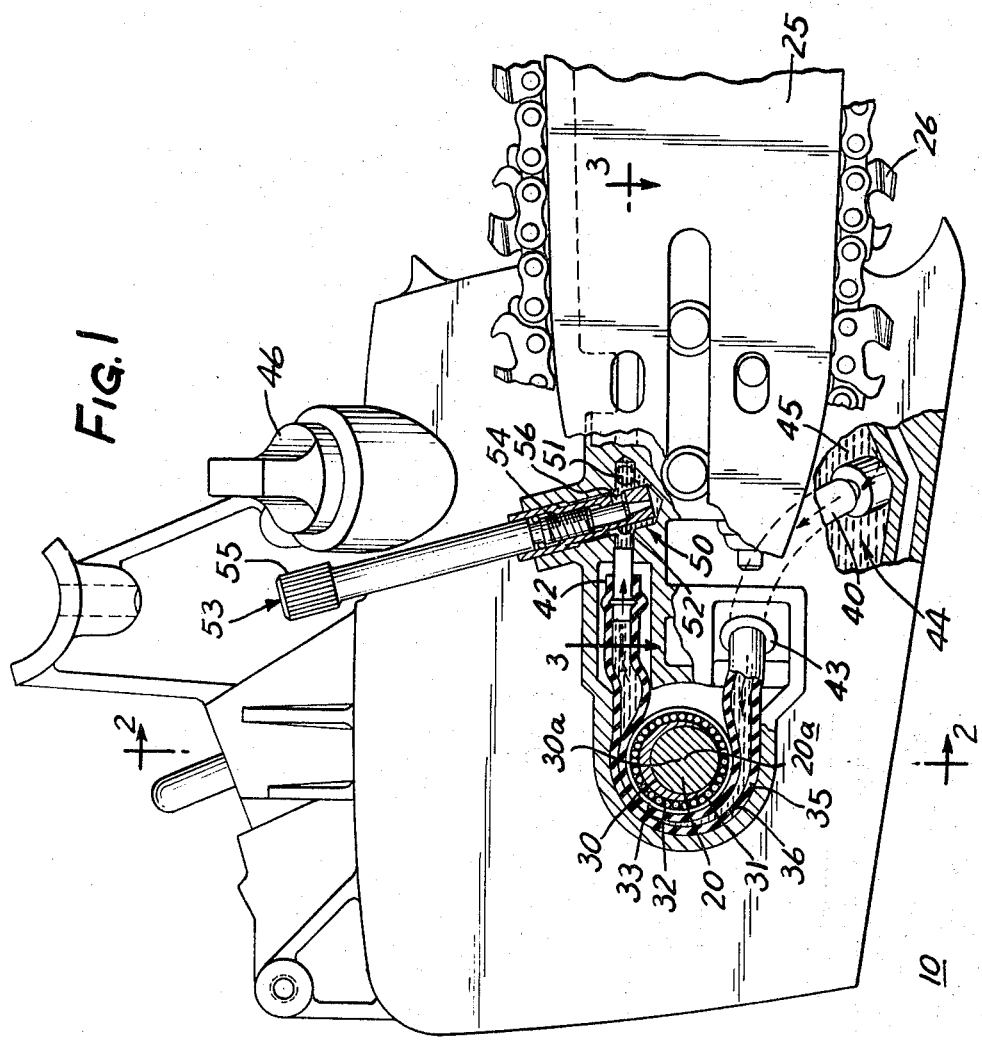
FIG. 1 is a side elevation of a chain saw embodying the invention, in partly fragmentary form, looking along the line 1—1 in FIG. 2.
Figure 2:
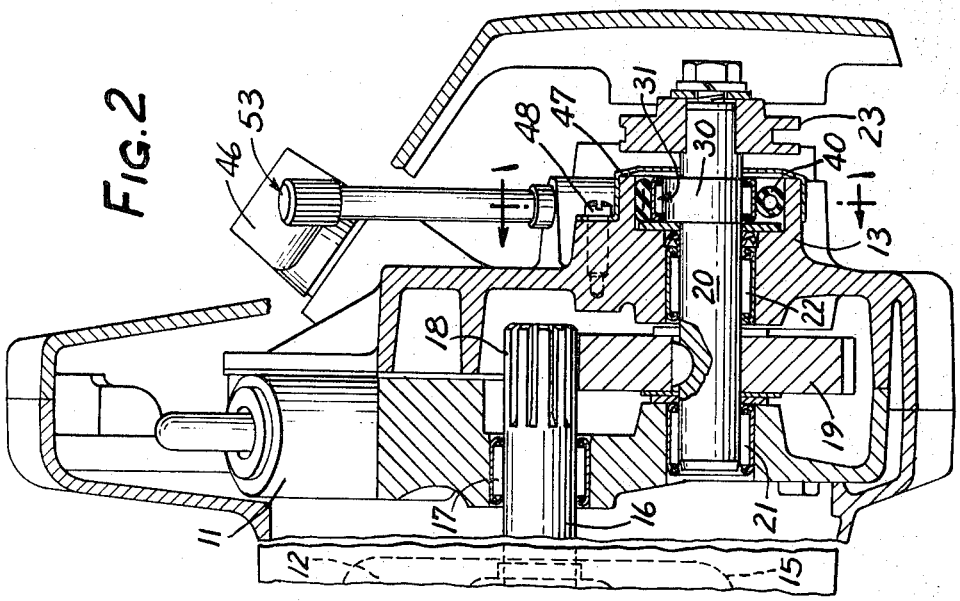
FIG. 2 is a transverse section looking along the line 2—2 in FIG. 1.

While the invention has been described in connection with a preferred embodiment, it will be understood that we do not intend to be limited to the particular embodiment shown but intend, on the contrary, to cover the various alternative and equivalent forms of the invention included within the spirit and scope of the appended claims.

Turning now to the drawings there is disclosed a chain saw 10 having a frame which preferably consists of three portions sandwiched closely side by side, a central portion 11, a motor housing 12 and an outboard portion 13. Where the chain saw is electrically powered, the housing includes an electric motor 15 having a shaft 16 which is supported at its right-hand end by a bearing 17. To provide one stage of speed step-down, the end of the motor shaft is formed as a pinion 18 driving a gear 19 on a drive shaft 20 supported in bearings 21, 22. The right-hand end of the drive shaft carries a chain drive sprocket 23.

FIG. 5 shows an alternate form of flow adjusting means.

Alined with the drive sprocket is a blade 25 with an endless cutter chain 26 trained about the blade and the sprocket.

In accordance with the present invention a circular single-lobed cam is eccentrically formed on the drive shaft and engages a C-shaped loop of flexible tubing, the loop of tubing having an inlet connected to the oil reservoir and an outlet which communicates with the cutter chain, the tube being adjustably restricted and intentionally kept open during at least a portion of each revolution of the cam for pumping of oil impositively at a slow but consistent feed rate, with most of the oil being diverted back to the reservoir.

Thus referring to the drawings, there is provided, preferably integrally with the drive shaft 20, and adjacent to the sprocket 23, a single-lobed circular cam 30. Encircling the cam is an anti-friction bearing 31, preferably of the "needle bearing" type, having an inner race 32 and an outer race 33. Surrounding the anti-friction bearing is an arcuate space 35 defined by curved inwardly facing wall 36 which is stationary and which preferably forms a part of the frame. At least the central portion of the wall 36 is approximately centered upon the axis 20a of the drive shaft. The eccentricity of the cam is slight, indicated by the spacing (FIG. 4) between the cam axis 30a and the shaft axis 20a.

Nested in the arcuate recess defined by the bearing and wall 36 is a length of flexible tubing 40 having an inlet portion 41 and an outlet portion 42. The inlet portion, which is preferably shielded with a screen 41a, passes through a grommet 43 into an oil reservoir 44 which is formed in the frame. The reservoir includes a body of oil 45 which may be replenished from time to time upon unscrewing a filler plug 46. The tube is preferably retained in its nested position by a cap 47 held in place by screws 48.

From the outlet 42 of the tube 40 the stream of oil flows into a bypass assembly 50 from which a portion of the oil flows through a passageway 51 to the lubricated surfaces of the chain while the bulk of the oil flows through a bypass connection 52 which leads back to the reservoir 44. For predetermining or adjusting the proportion of the oil which flows through the passage 51 to the chain of a restriction is provided in the bypass assembly. While such restriction may, as desired, either be interposed in the passageway 51 or in the bypass 52, we prefer to place the restriction, here in the form of a metering stem 53, in the passageway 51. The stem 53 is threaded at its inner end as shown at 54 and has a readily accessible knob 55 at its outer end for manual adjustment of the flow through an orifice 56.

It is one of the important features of the present invention that, unlike conventional pumps of the peristaltic type, the pumping action is impositive rather than positive. That is to say, in conventional pumps employing a length of flexible tubing a certain amount of fluid is displaced during each shaft revolution and the tube is at all times maintained sealed progressively at at least one point along its length. In the present pump the tubing 40 encircles the single-lobed cam for substantially less than a full revolution so that the arc of pumping is approximately 180°. In the remaining portion of the cam cycle, which may be referred to as the "idle arc", the "throw" of the cam is in a direction opposite to the loop of tubing so that the tubing is open continuously throughout its length. This "idleness" is accompanied by a number of advantages when used in combination with a saw chain. Primarily, the rate of discharge at the outlet 42 and the pressure at the outlet are substantially less than would be the case if pumping were positive with no idle arc. The sharply reduced average pressure against the metering restriction and the reduced rate of flow through the pump make it possible to achieve extremely low feed rates to the chain, feed rates on the order of a few ounces per hour, and without having to dispose of an excessive amount of oil through the bypass connection 52 back to the reservoir. Because of the inherently low average pressure at the outlet 42, low feed rates may be obtained without having to unduly restrict the orifice 56 which is controlled by the metering stem. This reduces the likelihood that such orifice will become clogged with impurities in the oil, particularly where it is the practice to employ "used" crankcase oil. A still further advantage of the impositive pumping, employing an idle arc, is that the pressure at the outlet 42 is cyclical or pulsating, being at a maximum when the cam 30 is actively pumping and at a minimum during the idle portion of the rotative cycle when the tube is open. Such bursts of pressure at a high cyclic rate further assist in keeping the passages, such as the orifice 56, clear, but where it is desired to reduce the peak level and especially where the flow is highly restricted, a simple form of accumulator, indicated diagrammatically at 57 in FIG. 4, may be used.

The net effect is to provide lubricant feed rates which are precisely suited to the needs of the chain, which are readily controllable over a useable range by manual, non-critical, adjustment of a metering stem and which are consistent and reliable. The present invention for the first time makes it possible to employ a peristaltic type of pump in a chain saw environment, a pump which operates directly off of the sprocket drive shaft without any reduction gearing or other complication and where the drive shaft speeds may be on the order of 3,000 to 5,000 r.p.m. Moreover, the feed rate varies automatically; the greater the speed of the drive shaft, the greater the flow.

While it is preferred to employ the metering stem 53 in the bypass assembly 50 at the outlet 42 of the tubing, it will be appreciated by one skilled in the art that it is not essential to have the metering stem at the outlet and, if desired, a metering stem may be provided at the inlet 41 to provide an adjustably throttled intake. Where this is done the passageway 50 which leads to the chain is preferably provided with a fixed restriction or orifice so that most of the oil will tend to be returned through the bypass 52 to the reservoir. Providing the adjustable restriction at the inlet 41 has the further advantage that the total amount of oil which is pumped in each revolution may be even further reduced.

In either event the amount of driving power required by the lubricating system is extremely low, so low as to be negligible. It is found that, in spite of the high rate of rotation of the drive shaft, long tube life may be achieved. For example a tube having an outer diameter of one-fourth inch and a wall thickness of one-sixteenth inch and made of rubber used with a cam having a throw of one thirty-second inch may be expected, with normal usage, to have a life which approaches the life of the saw itself. It is to be noted that because of use of the anti-friction bearing 31, the outer race 33 remains relatively stationary with respect to the frame so that there is no scuffing whatsoever at the inner curve of the loop of tubing, futher adding to longevity. However, where replacement is necessary it is easily accomplished by unscrewing the screws 48 which hold the cap 47.

In the structure described above, the throw of the cam is preferably so related to the internal dimension of the tubing, measured radially and with the tubing occupying its nested position, that the tubing barely closes during the operating cycle. Such "bare closure" in the present construction is entirely adequate by reason of the low output pressure and avoids any tendency toward overstressing the tubing. It is, however, one of the further features of the present invention, in one of its aspects, that the throw of the cam may be so related to the internal dimension of the tubing that the opposite walls do not come together at any time during the rotative cycle. In short, rather than the tubing being continuously "open" from end to end during only a portion of the cycle, as in the preferred embodiment, the tube may be at least partially open at all times in the sense that the opposite walls are not brought into actual touching engagement. Where this is done the tubing may encircle the cam by more than the 180° shown in FIG. 4 and, indeed, the tubing may, if desired, make a complete loop about the cam depending upon the degree of constant "openness" incorporated in the design. Using a tube which is at least partially open at all times results in a reduction in the flow so that less oil need be bypassed to the reservoir combined with low discharge pressures for convenient adjustment to low values of oil feed rate. Because of the normal viscosity of the oil reliable peristalic pumping is assured and the life of the tubing is lengthened by reason of the minimum degree of flexing.

It is found that the above lubricating arrangement feeds at a consistent rate in spite of variations in the viscosity of the oil. While the restriction provided by the throttling valve has a greater obstructing effect with increased viscosity, this is compensated by two effects: the increased obstruction which occurs in the bypass and the improved effectiveness of the peristalic action.

Where it is desired to protect against lack of oil in the reservoir, it is a simple matter to install a pressure responsive device at the outlet of the pump for operating a suitable warning indicator or a switch interlocked with the current supply or ignition system of the device.

The present invention being applicable to chain saws regardless of the source of rotative energy, the term "motor" used herein is employed in the general sense and includes both electric and gasoline engine drives.

The term "frame" is intended to include all of the relatively stationary structure. The term "closed" as used herein is a relative term which is applied to the approach of the tubing walls progressively to produce peristalic action and does not imply complete or tight closure. The term "anti-friction" bearing includes any bearing having cooperating inner and outer races. The term "impositive" as applied to pumping of oil is used for the purpose of distinguishing the present pump from peristalic pumps of the positive displacement type.

In the preferred form of the invention discussed above, the manual means for controlling the rate of feed of oil to the lubricated surfaces is in the form of a throttling valve placed in the flow passageway. It will be understood, however, that the invention is not necessarily limited thereto and that, if desired, the flow may be controlled by using throttling apertures which are fixed and by varying the position of the wall which forms the back-up surface for the tubing as the tubing is acted upon by the cam. Thus, referring to FIG. 5, there is shown an alternate form of the invention in which the wall 36 is not fixed but is effectively adjustable. This is accomplished by employing an auxiliary arcuate member 60 which is mounted upon a sliding block 61 which is mounted between way surfaces 62 and which is acted upon by an adjusting screw 63, the block 61 preferably being captive with respect to the screw. Sufficient clearance is provided within the wall, indicated at 36a, so that when the arcuate member 60 is fully retracted the tubing is subjected to only very slight peristalic action with correspondingly reduced flow. However, when the screw is turned, advancing the block 61 and arcuate member 60, the clearance, with respect to the cam, is taken up so as to bring about complete periodic closure of the tubing for more forcible pumping of oil. Indeed, both types of adjustments may be provided in the same structure if desired.

What we claim is:

1. In a chain saw the combination comprising a frame including a motor and providing an oil reservoir, a sprocket drive shaft coupled to the motor at one end and having a sprocket at the other and normally rotating in the range of 3,000–5,000 r.p.m., a blade secured to the frame in the plane of the sprocket, a saw chain trained about the sprocket and blade, the frame presenting between the motor and the sprocket an arcuate inwardly facing wall approximately centered on the axis of the drive shaft, a circular single-lobed cam on the drive shaft adjacent the sprocket, an anti-friction bearing having an inner race mounted on the circular cam and having an outer race which defines with said wall a C-shaped recess, a length of flexible tubing nested in the recess, the tubing having an inlet connected to the reservoir and having an outlet passage communicating with chain for feeding of oil thereto, the outlet passage having an adjustable restriction and a by-pass leading back to the reservoir, the eccentricity of the cam being approximately equal to the radially measured inner diameter of the tubing in nested position, the tubing extending about the drive shaft substantially less than a full revolution so that the tubing is progressively closed with peristalic action during only a portion of each revolution of the drive shaft and open during the remaining portion of the revolution for impositive pumping of oil, the restriction being located downstream of the by-pass passage but ahead of the chain, and the by-pass passage being located adjacent the cam and being substantially unobstructed to prevent build up of any substantial pressure in the outlet passage so that almost all of the pumped oil is immediately by-passed back to the reservoir with only a minor percentage on the order of a few ounces per hour being fed to the chain for continuous lubrication of the latter.

* * * * *